United States Patent
Murakami

(10) Patent No.: US 6,345,175 B1
(45) Date of Patent: *Feb. 5, 2002

(54) APPARATUS AND METHOD FOR PREVENTING BEAT INTERFERENCE

(75) Inventor: Yoshihiro Murakami, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/708,326

(22) Filed: Sep. 5, 1996

(30) Foreign Application Priority Data

Sep. 7, 1995 (JP) .............................. 7-256748

(51) Int. Cl.[7] .............................. H04B 1/10; H04B 1/06; H03B 21/00
(52) U.S. Cl. ........................ 455/296; 455/265; 455/317; 331/37
(58) Field of Search ................................. 455/296, 310, 455/255, 257–258, 260, 265, 317, 318; 331/1 A, 37, 40, 42, 64, 158, 116 R; 375/373, 376

(56) References Cited

U.S. PATENT DOCUMENTS

| | | | |
|---|---|---|---|
| 4,317,220 A | * 2/1982 | Martin | 455/503 |
| 5,081,705 A | * 1/1992 | Swanke | 455/73 |
| 5,347,232 A | * 9/1994 | Nishimichi | 331/1 A |
| 5,373,254 A | * 12/1994 | Nakauchi et al. | 331/1 A |
| 5,473,767 A | * 12/1995 | Kardach et al. | 713/600 |
| 5,604,928 A | * 2/1997 | Hamano et al. | 455/310 |
| 5,691,737 A | * 11/1997 | Ito et al. | 340/825.72 |
| 5,745,848 A | * 4/1998 | Robin | 455/296 |
| 5,852,728 A | * 12/1998 | Matsuda et al. | 714/2 |
| 5,900,757 A | * 5/1999 | Aggarwal et al. | 327/198 |

FOREIGN PATENT DOCUMENTS

| | | | | |
|---|---|---|---|---|
| JP | S58-103278 | * | 6/1983 | H04N/5/92 |
| JP | H08-098197 | * | 4/1996 | H04N/9/44 |

* cited by examiner

Primary Examiner—Vivian Chang
Assistant Examiner—Charles N. Appiah
(74) Attorney, Agent, or Firm—Frommer Lawrence & Haug LLP; William S. Frommer; Dennis M. Smid

(57) ABSTRACT

Interference in a receiver caused by a beat frequency arising from mutual interference of local oscillation signals from other, proximately located receivers is prevented by changing over between an externally supplied clock signal and internal clock signal. The selected clock signal is used as the local oscillation signal of the receiver, thereby removing a difference between the mutually interfering local oscillation signals and preventing the beat interference from arising.

19 Claims, 7 Drawing Sheets

INTERNAL OSCILLATOR

RECEIVER

LOCAL OSCILLATOR

MUTUAL INTERFERENCE BY LOCAL OSCILLATION SIGNAL (1)

MUTUAL INTERFERENCE BY LOCAL OSCILLATION SIGNAL (2)

FREQUENCY LEVEL

APPARATUS AND METHOD FOR PREVENTING BEAT INTERFERENCE

BACKGROUND OF THE INVENTION

The present invention relates to preventing beat interference between receiving devices and, more particularly, to a receiving system which prevents beat interference between proximately situated receivers receiving a common radio signal.

An example of a receiver which receives radio frequency signals from a transmitter and converts them into an audio signal suitable for audio reproduction by, for example, a speaker, is shown in FIG. 3, wherein the radio signal Si is received via an antenna 2 of receiver 1. The radio signal Si is filtered by band-pass filter 3, amplified by high frequency amplifier 4 and filtered again by band-pass filter 5. A mixer 6 generates a fixed band signal by mixing the filtered signal with a lower frequency local oscillation signal S2 provided by a local oscillator 7. The fixed band signal S3 is further filtered by band-pass filter 8 and amplified by high-frequency amplifier 9. This signal is, then, mixed in mixer 10 with another local oscillation signal S4 generated by local oscillator 7 to produce an intermediate frequency signal of an intermediate frequency. An IF amplifier 11 amplifies this intermediate frequency signal and a detector 12 detects the amplified IF signal to generate the audio signal S6 suitable for audio reproduction.

An example of local oscillator 7 is shown in FIG. 4, wherein an internal oscillator 13 generates an internal clock signal S7 which is frequency divided by frequency dividers 14, 15 and coupled to respective phase locked loop (PLL) circuits 16, 17. It will be appreciated that the internal clock signal S7 may be supplied additionally to a control circuit (not shown) of a CPU or other processor as a reference clock. Each of the two PLL circuits in FIG. 4 have the same construction in this example and each includes a phase comparator 18 (21) which generates a phase difference signal indicating a difference in phase between the internal clock signal and a local oscillation signal generated by a voltage controlled oscillator (VCO) 20 (23) and fed back through a frequency divider 21 (24). A low pass filter 19 (22) band-passes this phase difference signal to VCO 20 (23) which generates the local oscillation signal S2 (S4).

Problematically, if two supposedly identical receivers include local oscillator 7, the local oscillation signal generated by the local oscillator in, for example, receiver 1A of FIG. 5 and interferes with the local oscillation signal generated by the local oscillator of proximately situated receiver 1B, such as when receivers are used to provide useful information during a "walking tour". This situation arises, for example, when the conductive housing of the receiver acts as an antenna and transmits the local oscillation signal. Attempts to shield the housing, or to insert an isolator between the receivers, or to split the antenna signal between the receivers 1A, 1B (FIG. 6) has been found inadequate to prevent the interference because some leakage of the local oscillation signal always occurs.

The problem described above is particularly noticeable when two local oscillation signals from different receivers have slightly different frequencies, which may be due to the physical characteristics of each receiver or the difficulty arising out of adhering to very close manufacturing tolerances. As shown by the frequency-domain graph of FIG. 7, for example, two local oscillation signals associated with receivers 1A and 1B may be set at the slightly different frequencies of 850 and 851 MHz. These local oscillation signals (1A, 1B) combine to create high frequency interference signals (a, b) near the frequencies of 852 and 849 MHz, respectively. When a third receiver (1C) has a local oscillation signal at the frequency of 852 MHz, a difference (d) between this frequency and the frequency of the nearby interference signal (a) creates interference which manifests in the reproduced audio sound as a beat.

This "beat" interference arises conspicuously when receivers are situated proximate enough to receive the interfering signals. An example of this proximate situation is a tour group of people shown in FIG. 8A touring through a museum and carrying wireless receiver head-sets which receive a common radio signal of audio information about a viewed museum piece. Since these local receivers are tuned to receive the common radio signal, the generated local oscillation signals of slightly different frequencies are combined to generate mutual interference which is picked up by the other receivers, thus, causing beat interference. It will be appreciated that shielding the receivers by inserting an isolator or by splitting the antenna between a plurality of receivers in such a tour group is impractical because such measures would restrict the user's movement.

Since beat interference arises when local oscillation signals exhibit different frequencies, it is theoretically possible to prevent beat interference by using receiver components of precisely the same electronic characteristics for all receivers because this would cause the local oscillation signals in each receiver to have the same frequency. However, it is quite difficult and expensive to manufacture a plurality of receivers with the same electronic characteristics. Typically, an internal oscillator has a precision of ±5 [ppm], meaning that is such an oscillator tuned to generate 850 MHz will, in fact, generate 850 MHz±4.25 KHz. This problem is compounded when there are more than two receivers which need to be precisely manufactured, such as when a large group of users tour a museum with many receiver head-sets. Problematically, beat interference is audibly disturbing to such individuals, seriously diminishing the acceptance of such audio signal reproduction.

OBJECTS AND SUMMARY OF THE INVENTION

It is an object, therefore, to provide an apparatus and method for preventing beat interference in the aforementioned environment.

It is a further object to provide an apparatus and method for preventing beat interference arising from mutual interference of a plurality of receivers.

It is an even further object to provide an apparatus and method for preventing beat interference caused by a difference in local oscillation signal frequencies among a plurality of proximate receivers.

In accordance with the above objectives, the present invention provides an apparatus and method for preventing beat interference among receivers by selecting either an external clock signal that is transmitted to all receivers or, if no external clock signal exists, selecting an internal clock signal generated internally by each receiver. With this invention, each receiver can receive the same external clock signal as other receivers and the local oscillation signal for that receiver may be set precisely to the local signal oscillation frequency thereby preventing beat interference from arising.

In addition, the present invention also provides a receiver system formed of a plurality of receivers coupled in parallel to form a relay. Each of the receivers selects the external clock signal transmitted thereto, and in the absence of the external clock signal selecting the internal clock signal, thereby setting each of the respective local oscillation signals to the same frequency to prevent beat interference arising from a difference of local oscillation frequencies.

BRIEF DESCRIPTION OF THE DRAWINGS

The above objects, features and advantages of the present invention will become apparent from the following detailed description of illustrative embodiments which is to be considered in connection with the accompanying drawings, in which.

DETAILED DESCRIPTION OF THE PREFERRED EMBODIMENTS

Figure 3:
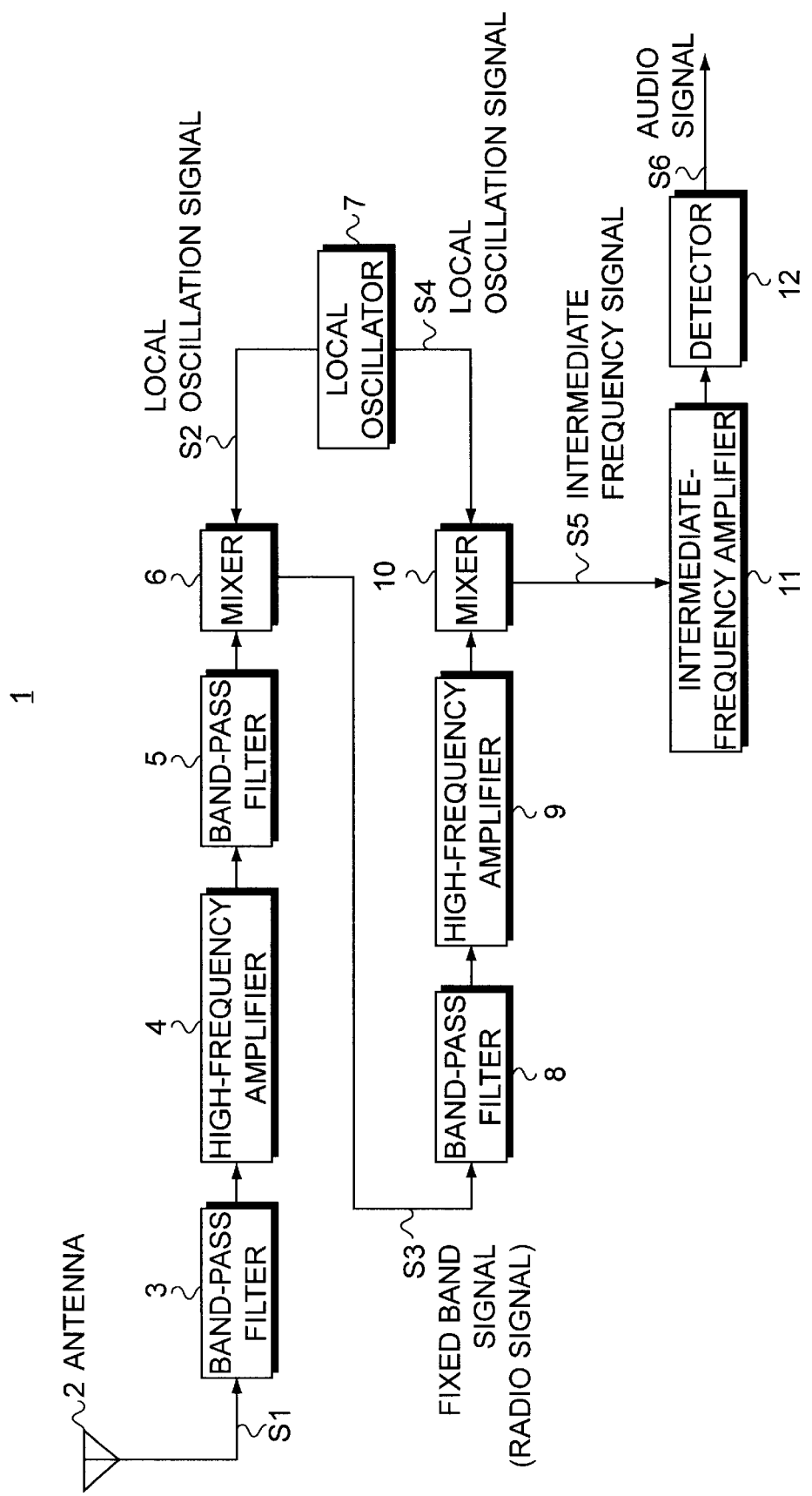
FIG. 3 is a block diagram of a receiver of the prior art.

Referring now to the drawings, wherein like reference numerals designate identical or corresponding parts throughout the several views, a receiver in accordance with the present invention for preventing beat interference will now be described. In the present invention, the receiver 1 of FIG. 3 generates local oscillator signals either from an internal crystal oscillator which is used to generate an internal clock signal or from an external clock signal that is transmitted to the receiver as part of the radio signal S1. The external clock signal S10 is received with the radio signal at an input terminal 31 of a specialized internal oscillator 30 shown in FIG. 1, which acts as the aforementioned local oscillator. An external clock signal detector 40 detects whether the radio signal supplied to terminal 31 and buffered by buffers 32 and 33 includes the external clock signal S10. A voltage comparator 41 compares the output of detector 40 to a reference level and generates a switching signal S11 as a result of such comparison. The switching signal S11 triggers a reset signal generator 80 to reset a CPU 90; and also controls a selector 50 to switch between the external clock signal received at terminal 31 and an internal clock signal generated by an internal clock generator 60. The voltage comparator also triggers a stop controller 70 to stop the generation of the internal clock signal by clock generator 60 when the external clock signal is detected. Depending upon the switching, either the external clock signal or the internal clock signal is buffered by buffer 36 to the CPU where the selected clock signal (CK1) is used in timing the signal processing operations; and the selected clock signal is buffered by buffer 37 to the local oscillator generator 7 (FIG. 1) where the selected clock signal is used to generate the local oscillation signal.

The operation of the specialized internal oscillator of the present invention will be described with reference to the timing diagram of FIGS. 2A–2E. At the beginning of a cycle (time T0), it is assumed the external clock signal S10 is not transmitted to terminal 31, as indicated by the low level state "L" of FIG. 2A. Accordingly, the signal buffered to the external clock signal detector by buffers 32, 33 is also at the low level state "L". At time T1 it is assumed the external clock signal is present as a train of clock pulses and will be detected as will be explained.

Figure 1:
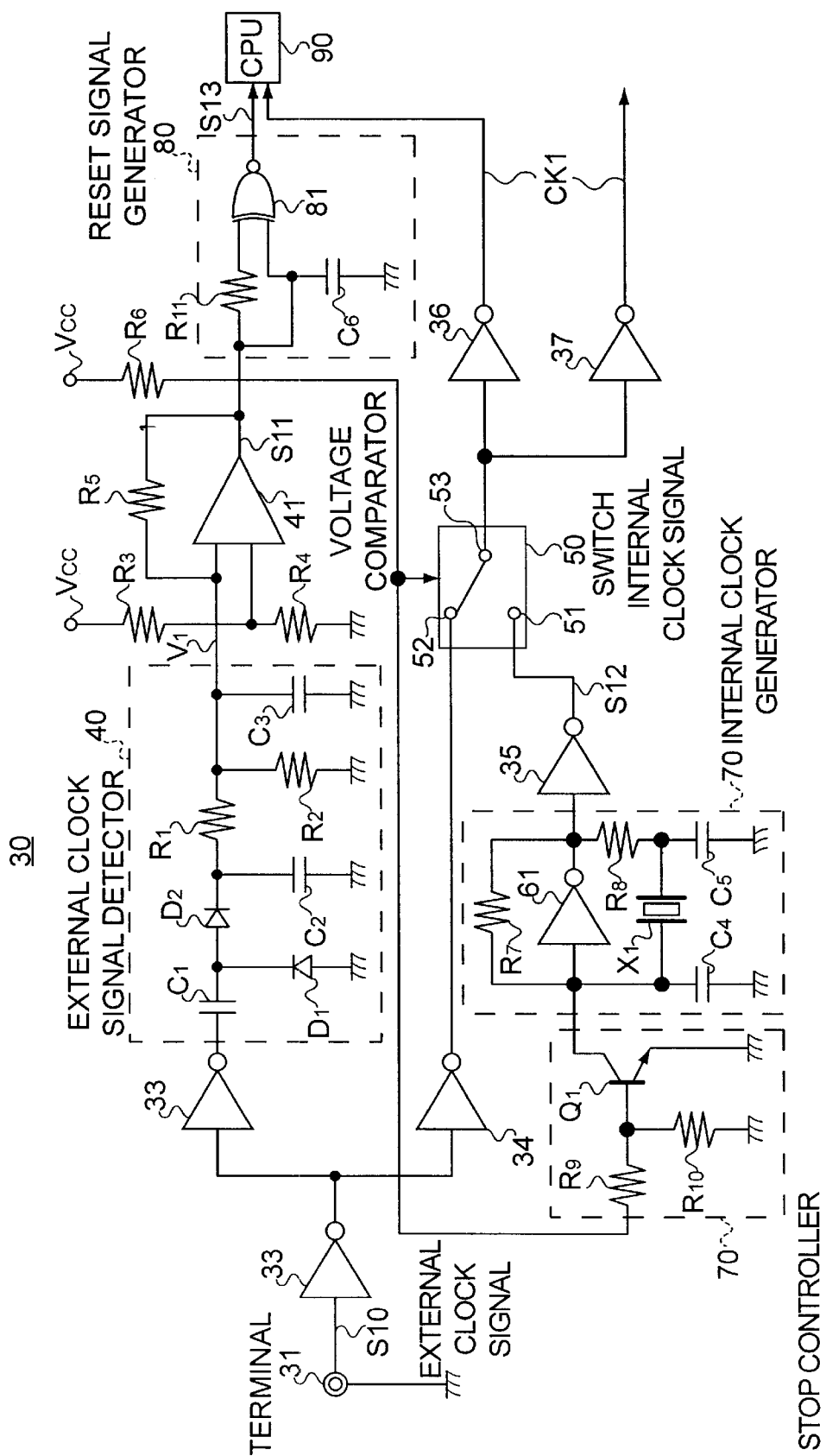
FIG. 1 is a schematic diagram of a specialized internal oscillator of a receiver according to the present invention.

The external clock signal detector 40 detects whether the external clock signal is present in the buffered signal supplied by buffer 33. In the example of FIG. 1, the external clock signal detector includes a rectifying section including a capacitor C1 which acts as a filter and rectifying diodes D1 and D2 which rectify the filtered signal to produce a DC signal therefrom. The DC signal is, then, smoothed by smoothing capacitor. C2, voltage divided by resistors R1 and R2 and smoothed by smoothing capacitor C3 to be output as voltage V1. At time T0, no external clock signal is received and the external clock signal detector transfer a low level state "L" to its output as voltage V1. At time T1, on the other hand, the external clock signal formed of a train of clock pulses is detected and smoothed into a steady-state DC signal which is applied to the voltage comparator as voltage V1.

The voltage comparator compares the voltage V1 to a reference voltage derived from voltage source VCC to produce the switching signal S11. In this example, the voltage comparator may be comprised of an operational amplifier with its noninverting input connected to a voltage divider formed of resistors R3 and R4. The inverting input of the operational amplifier is coupled to receive the voltage V1; and as is shown, feedback is provided via resistor R5. A load resistor R6 is provided because the operational amplifier in this example is of the open-collector type and performance is improved by a load resistance pulled up by the reference voltage VCC. With such a voltage comparator, the switching signal S11 is normalized to the reference voltage VCC when an external clock signal is present and to ground when there is no external clock signal.

Figure 2:
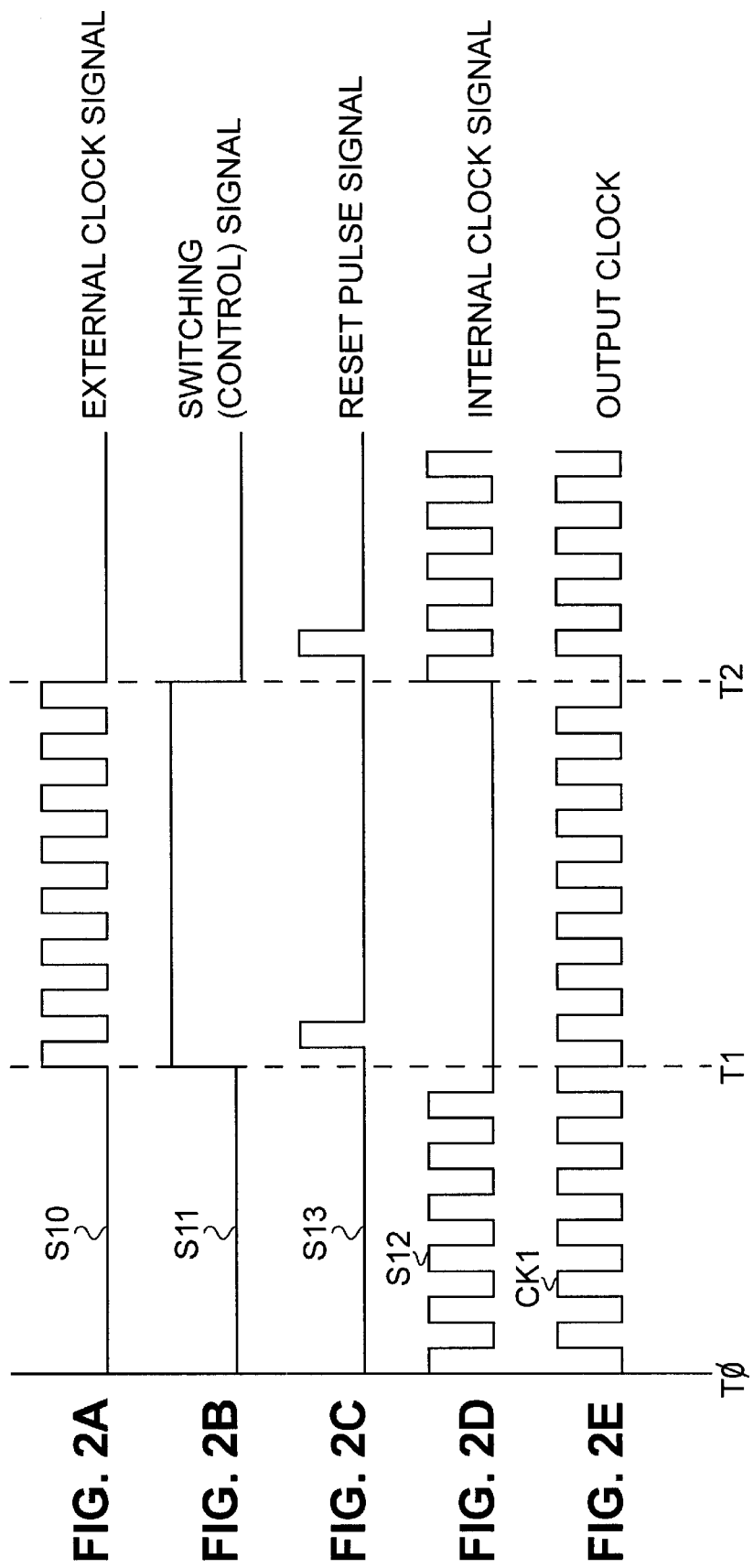
FIGS. 2A–E are timing diagrams for the signals generated by the circuit shown in FIG. 1.

At time T0, no external clock signal is present and the switching signal S11 is set to ground (i.e., a low level state " L") as shown in FIG. 2B. On the other hand, the switching signal S11 is pulled up to the normalized value of VCC as a high level state "H" when the external clock signal is present at time T1.

The switching signal S11 is, then, coupled to reset signal generator 80 that generates the reset pulse signal S13 shown in FIG. 2C which resets the CPU at a time when the clock signal is switched between the external and internal clock signals. It is considered that switching between different clock signals disrupts the signal processing operations of the CPU. By providing the reset signal generator to reset the CPU at the precise time of switching, the present invention prevents this disruption from occurring.

The reset signal generator is, in effect, a pulse trigger formed of an exclusive NOR circuit which emits a pulse whenever its input logic signals change. As shown in FIG. 1, for example, whenever the switching signal S11 switches from a low level state "L" to a high level state "H" (time T1) the input of the exclusive NOR (XNOR) circuit connected to a capacitor C6 remains low for a charging period while the input connected to a resistor R11 (which receives the switching signal S11) is set high almost immediately. During this time, the XNOR logic gate senses that neither of the inputs are the same and outputs a high level "H" as the reset pulse signal S13 (FIG. 2C). When the capacitor C6 charges up to the high level, the XNOR inputs then are at the same state again and the XNOR logic gate outputs a low level state. The same is true for the opposite case where the switching signal switches back to a low level state "L"; i.e., the input connected to the resistor R11 drops almost immediately to the low level state while the other input is still charged high by the capacitor C6 and the XNOR logic gate outputs the reset pulse signal S13. After the capacitor C6 discharges, both XNOR inputs are at the same level again and the reset pulse is set low. The resulting XNOR output signal is the reset pulse signal shown in FIG. 2C which resembles a trigger pulse. Capacitor 6 and resistor R11 determine the width of reset pulse S13.

Figure 4:
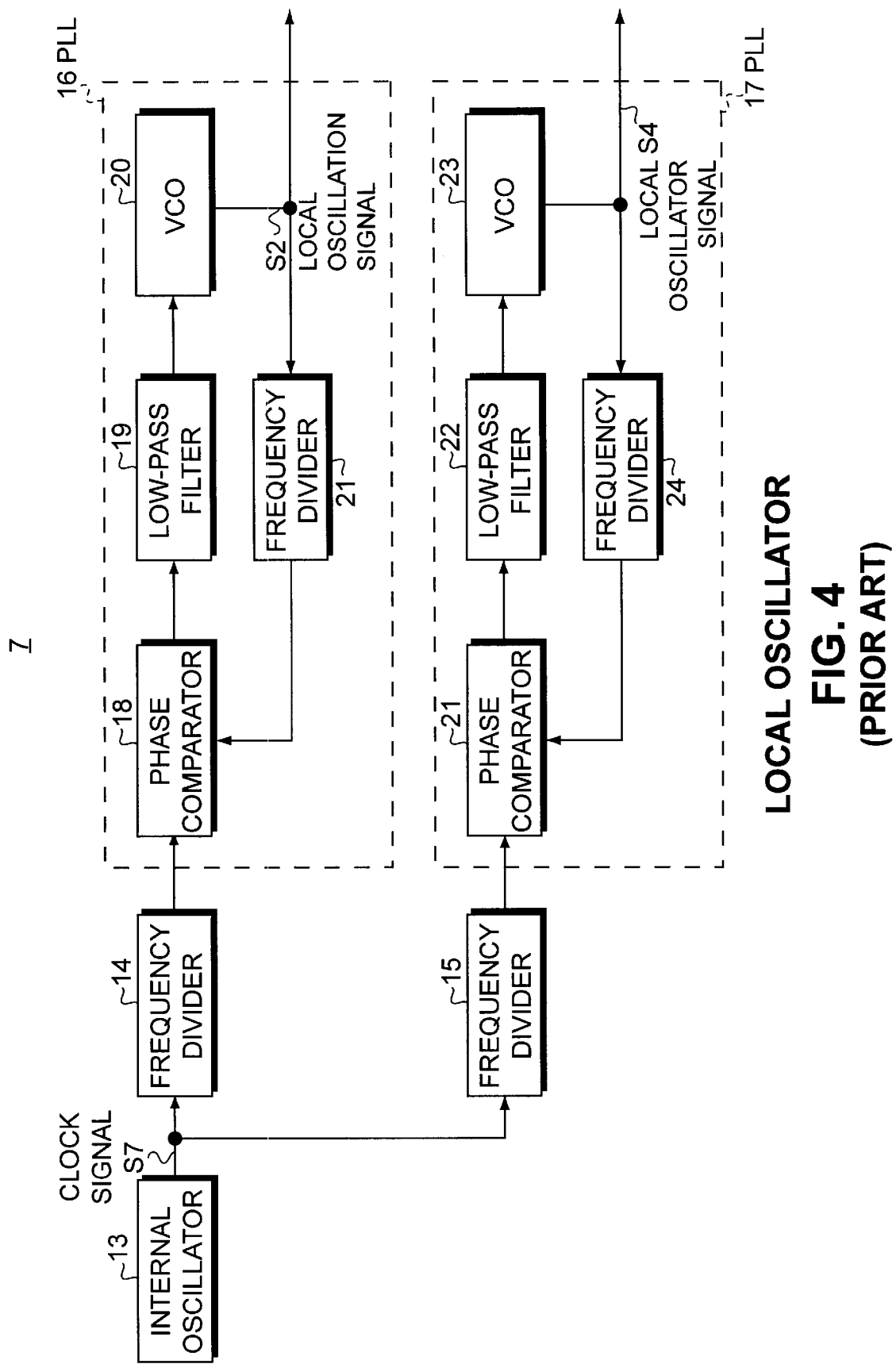
FIG. 4 is a block diagram of a local oscillator.
Figure 5:
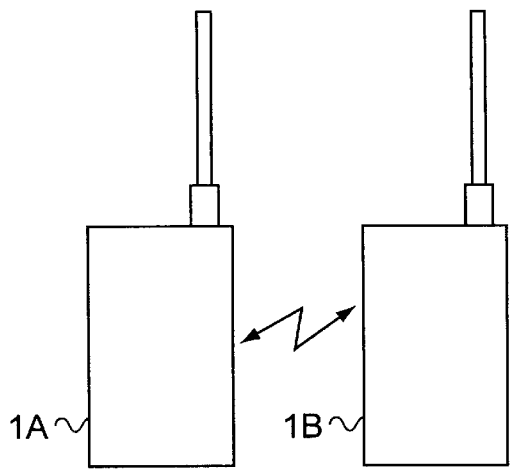
FIG. 5 is an illustration of proximate receivers that result in mutual interference of the local oscillation signals therefrom.
Figure 6:
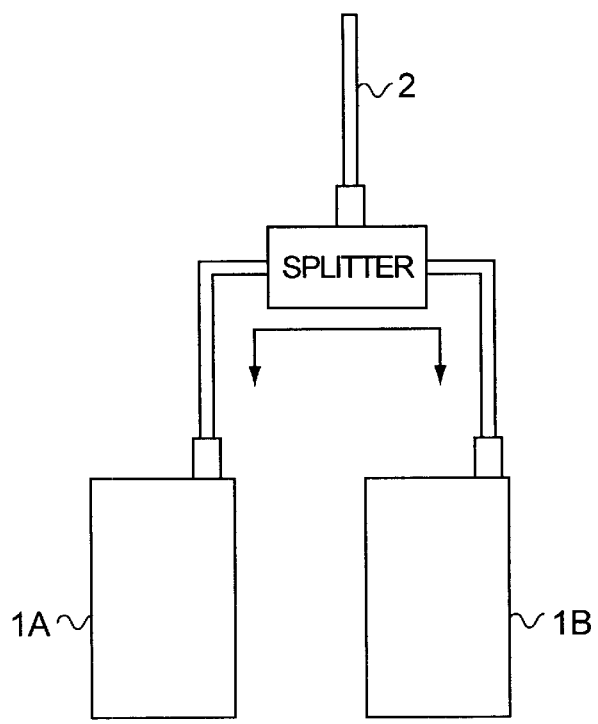
FIG. 6 is an illustration of using a common antenna in an attempt to prevent the mutual interference of the two receivers in FIG. 5.
Figure 7:
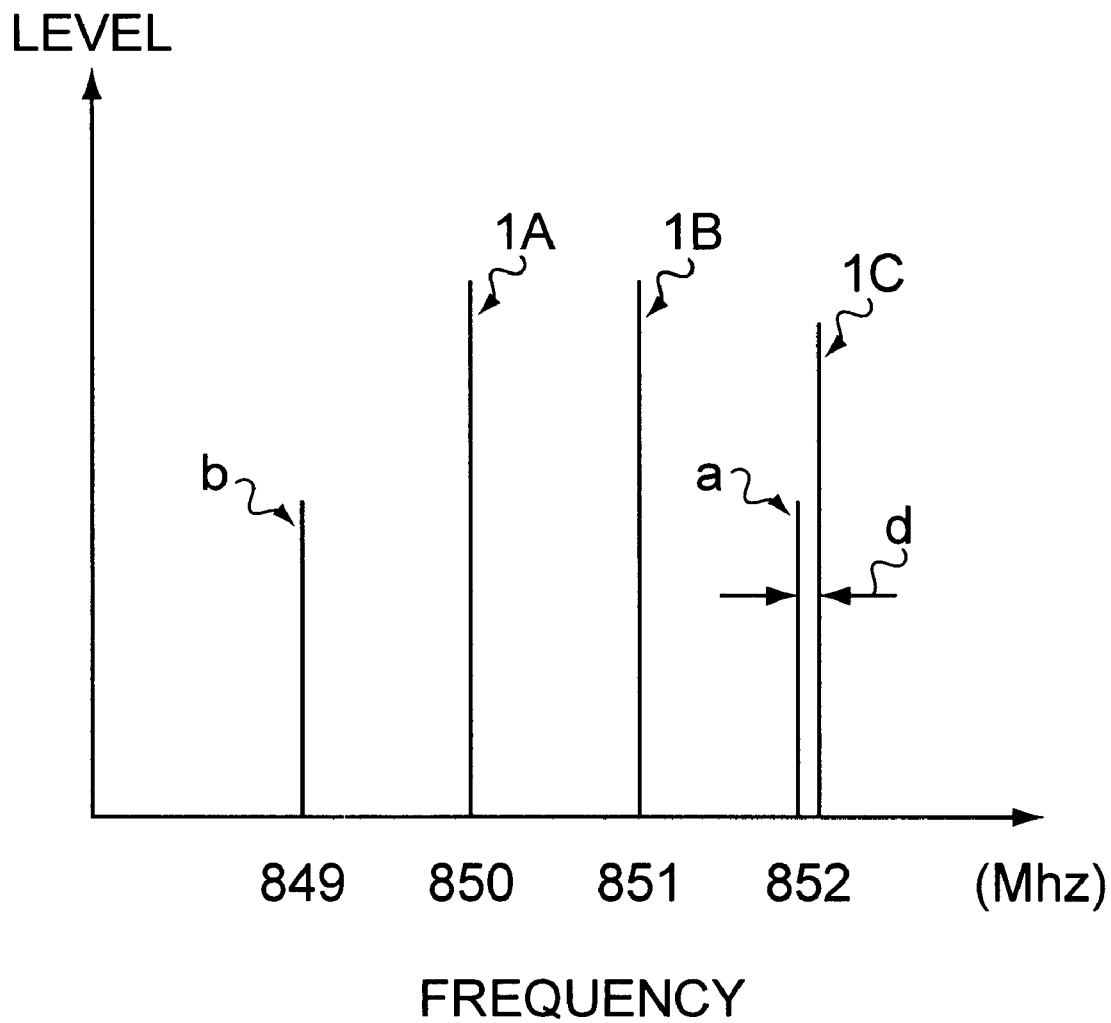
FIG. 7 is a frequency-domain graph for the explanation of beat frequency arising from the mutual interference.

The switching signal S11 is further coupled as a control signal to a switch 50 that couples the external clock signal S10 buffered from buffer 34 and couples the internal clock signal generated by internal clock generator 60 (explained later) to output terminal 53. The switch is controlled by the switching signal S11 to switch to the external clock signal when such signal is detected by the external clock signal detector and to switch to the internal clock signal when the external clock signal is not present. The switch outputs the selected clock signal from output terminal 53 to both the CPU 90 via buffer 36 and to the local oscillator 7 (FIG. 3) via buffer 37 as the clock signal (CK1). It will be appreciated that the clock signal output from buffer 37 is supplied to frequency dividers 14 and 15 shown in FIG. 4.

When the external clock signal is not present, the internal clock signal is generated by the internal clock generator 60. The internal clock generator includes a crystal oscillating element X1 which is connected across grounded capacitors C4 and C5 to form a crystal oscillator. An inverting amplifier 61 provides amplification of the crystal oscillator output and a resistance R7 is connected as a feedback resistor. A resistor R8 limits the excitation level of the crystal oscillator element X1. The internal clock signal S12 generated by this generator is supplied to switch 50, via buffer 35, for selection by the switch depending upon the level of the switching signal S11.

It will be appreciated that the internal clock generator would otherwise oscillate indefinitely whether or not the external clock signal is present. This could be problematic because the internal oscillation signal can be transmitted erroneously if it is not sufficiently shielded, thereby causing beat interference in other receivers. To prevent this from occurring, the present invention further provides a stop controller 70 that stops the operation of the internal clock generator when the switching signal S11 indicates that the external clock signal is present.

According to the example of FIG. 1, the stop controller generates a stop signal when the switching signal S11 is present and is supplied to resistors R9 and R10. The switching signal is applied to the base of a transistor Q1 which turns "on" when the switching signal is high "H" indicating that the external clock signal is present (time T1). At this time, the transistor Q1 is "on" to supply ground potential to the input of the inverter 61, thereby turning "off" the inverter 61 and, consequently, the internal clock, shown at time T1 in FIG. 2D.

With the present invention, the external clock signal is selected over the internal clock signal to generate the local oscillation signal and to time the signal processing operations of the CPU when the external clock signal is present. In this manner, the local oscillation signal frequency for all receivers is set precisely to the external clock signal such that the receivers are not subject to beat interference. In addition, the CPU is reset each time the selected clock is changed between external and internal clocks in order to prevent a disruption in the signal processing operations. Furthermore, when the external clock signal is detected, the internal clock generator is suspended from generating the internal clock signal to ensure that this signal is not transmitted erroneously which would cause the beat interference.

Figure 8A:
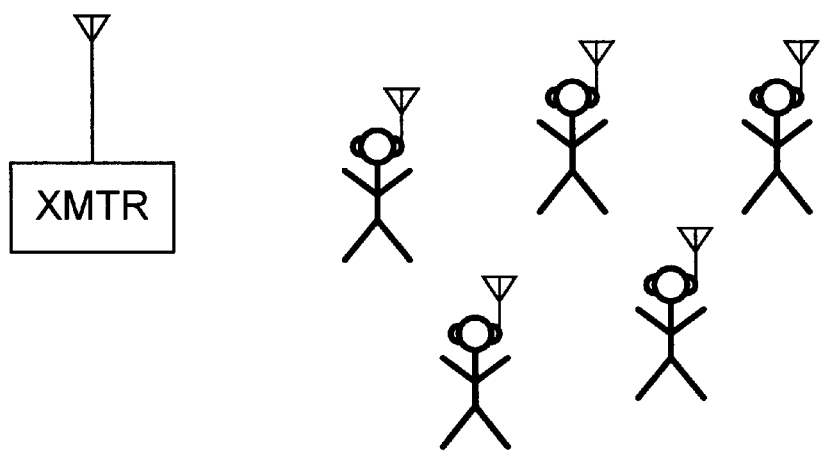
FIG. 8A is an illustration of a tour group with receiver/head-sets which incorporate the present invention.
Figure 8B:
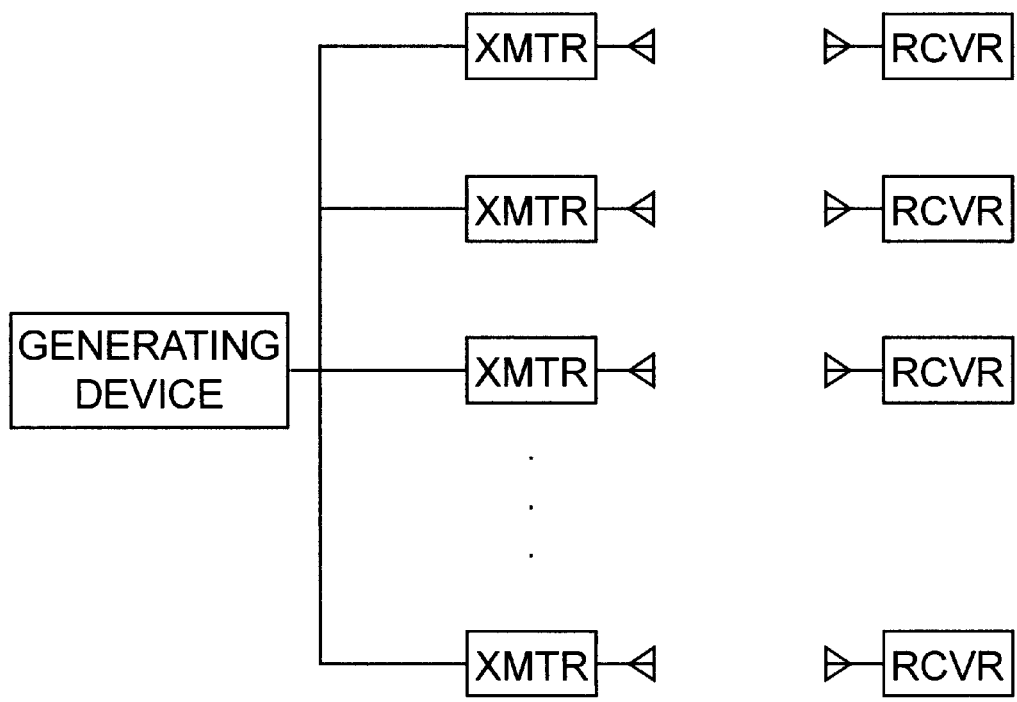
FIG. 8B is a schematic representation of a receiver system which incorporates the present invention.

The present invention is particularly suited for audio tour arrangements which employ a plurality of local receivers in the form of receiver/head-sets (FIG. 8A). Each receiver/ head-set may be coupled to a transmitter forming a transmitter-receiver pair. The transmitters are, in turn, coupled in common to the external clock signal to form a relay system. With this arrangement, the present invention provides a receiver system for tour systems with proximately situated head-sets that receive a common radio signal without interference of a beat frequency. It will be appreciated that the present invention is applicable not only to tour systems, but to other arrangements where a plurality of receivers in close proximity are tuned to receive a common radio signal, such as airplane transmission of entertainment programs, seminars, and cellular phone reception.

Although the present invention has been described in particular detail to the preferred embodiments, it is to be noted that the invention is not limited thereby, and that various changes and modifications may be affected therein by one skilled in the art without departing from the scope of the invention which is intended to be defined by the appended claims.

We claim:

1. An apparatus for reconstructing an audio signal from a transmitted radio signal, comprising:

means for receiving the transmitted radio signal;

internal clock signal generating means and including a local oscillator for generating a local clock signal for internally providing timing for reconstructing said audio signal from the received radio signal;

detecting means for detecting whether the received radio signal includes an external clock signal for providing timing for reconstructing said audio signal from said radio signal;

selecting means for selecting as said local oscillation signal used to reconstruct the audio signal said external clock signal when said detecting means detects said external clock signal and for selecting as said local oscillation signal said local clock signal when said external clock signal is not detected; and means for stopping all of the internal clock signal generating means included within the respective apparatus which do not receive an input clock signal so as to inhibit the generation of the respective local clock signals from within the respective apparatus when said detecting means detects said external clock signal.

2. A receiver for receiving and converting a radio signal transmitted at a radio signal frequency into an audio signal suitable for audio reproduction by mixing said radio signal with a local oscillation signal, wherein said receiver is subject to beat frequency interference which manifests in the reconstructed audio signal as an audible beat caused by erroneous pick-up of another local oscillation signal from another receiver substantially tuned to receive the same said radio signal, comprising:

means for receiving the transmitted radio signal;

internal clock means for generating an internal clock signal for providing timing for reconstructing said audio signal from the received radio signal;

external clock detecting means for detecting whether the received radio signal includes an external clock signal for providing timing for reconstructing said audio signal from said radio signal;

selecting means, responsive to said external clock detecting means, for selecting as said local oscillation signal said external clock signal when said external clock detecting means detects said external clock signal and for selecting as said local oscillation signal said internal clock signal when said external clock signal is not detected; and means for stopping all of the internal clock means included within the respective receiver which do not receive an input clock signal so as to inhibit the generation of the respective internal clock signals from within the respective receiver when said external clock signal is detected by said detecting means;

wherein both said receiver and said another receiver select said external clock signal as said local oscillation signal with the same said frequency such that said beat frequency interference is suppressed.

3. The receiver according to claim 2, wherein said selecting means comprise switch change-over means for switching between said external clock signal when detected by said detecting means and said internal clock signal when said external clock is not detected.

4. The receiver according claim 2, wherein said receiver includes processor means for processing said radio signal; and reset means for generating a reset signal for resetting said processor means when said selecting means selects between said external clock signal and said internal clock signal, thereby preventing a disturbance in said processing of said radio signal caused by a transition from said external clock signal to said internal clock signal.

5. The receiver of claim 2, further comprising phase locked loop means coupled to receive said local oscillation signal for generating an oscillating signal phase locked to said local oscillation signal.

6. The receiver according to claim 2, further comprising mixing means for mixing said radio signal with said local oscillation signal to produce therefrom an intermediate frequency signal.

7. The receiver according to claim 6, further comprising an intermediate frequency amplifier for amplifying said intermediate frequency signal.

8. A receiver system having a plurality of proximately situated local receivers for receiving a common radio signal, such that interference signals erroneously transmitted by a local receiver are received by at least one other of said local receivers, and for converting said common radio signal into an audio signal suitable for audio reproduction by frequency mixing said radio signal with a local oscillation signal, wherein each local receiver is subject to beat frequency interference which manifests in the reconstructed audio signal as an audible beat caused by erroneous pick-up of another local oscillation signal of different frequency from another local receiver, each local receiver comprising:

means for receiving the radio signal;

internal clock means for generating an internal clock signal for providing timing for reconstructing said audio signal from the received radio signal;

external clock detecting means for detecting whether the received radio signal includes an external clock signal for providing timing for reconstructing said audio signal from said radio signal;

selecting means, responsive to said external clock detecting means, for selecting as said local oscillation signal said external clock signal when said external clock detecting means detects said external clock signal and for selecting as said local oscillation signal said internal clock signal when said external clock signal is not detected;

means for stopping all of the internal clock means included within the respective local receiver which do not receive an input clock signal so as to inhibit the generation of the respective internal clock signals from within the respective local receiver when said external clock signal is detected by said external clock detecting means;

whereby both a respective local receiver and another local receiver select said external clock signal as said local oscillation signal with the same said frequency such that said beat frequency interference is suppressed.

9. The receiver according to claim 8, wherein said selecting means comprise switch change-over means for switching between said external clock signal when detected by said detecting means and said internal clock signal when said external clock is not detected.

10. The receiver according to claim 9, further comprising phase locked loop means coupled to receive said local oscillation signal for generating an oscillating signal phase locked to said local oscillation signal.

11. The receiver according to claim 9, further comprising mixing means for mixing said radio signal with said local oscillation signal to produce therefrom an intermediate frequency signal.

12. The receiver according to claim 11, further comprising an intermediate frequency amplifier for amplifying said intermediate frequency signal.

13. The receiver according claim 8, wherein each receiver includes processor means for processing said radio signal; and reset means for generating a reset signal having a predetermined pulse width for resetting said processor means when said selecting means selects between said external clock signal and said internal clock signal, thereby preventing a disturbance in said processing of said radio signal caused by a transition from said external clock signal to said internal clock signal.

14. A method of receiving radio signals by a plurality of proximately situated local receivers for receiving a common radio signal, such that interference signals erroneously transmitted by a local receiver are received by at least one other of said local receivers, and for converting said common radio signal into an audio signal suitable for audio reproduction by frequency mixing said radio signal with a local oscillation signal, wherein each local receiver is subject to beat frequency interference which manifests in the reconstructed audio signal as an audible beat caused by erroneous pick-up of another local oscillation signal of different frequency from another local receiver, comprising the steps of:

receiving the radio signal;

generating an internal clock signal by use of internal clock signal generating means for providing timing for reconstructing said audio signal from the received radio signal;

detecting whether the received radio signal includes an external clock signal for providing timing for reconstructing said audio signal from said radio signal;

selecting said external clock signal as said local oscillation signal when said external clock signal is detected and selecting said internal clock signal as said local oscillation signal when said external clock signal is not detected; and stopping all of the internal clock signal generating means within the respective local receiver which do not receive an input clock signal so as to inhibit the generation of the respective internal clock signals within the respective local receiver when said external clock signal is detected, whereby both a respective local receiver and another local receiver select said external clock signal as said local oscillation signal with the same said frequency such that said beat frequency interference is suppressed.

15. The method according to claim 14, wherein said step of selecting switches between said external clock signal when detected and said internal clock signal when said external clock is not detected.

16. The method according to claim 15, wherein each receiver includes a phase locked loop having a controllable oscillator, and further comprising the step of phase-locking said controlled oscillator to said local oscillation signal.

17. The method according to claim 15, further comprising the step of mixing said radio signal with said local oscillation signal to produce therefrom an intermediate frequency signal.

18. The method according to claim 17, further comprising the step of amplifying said intermediate frequency signal.

19. The method according claim 14, wherein each receiver includes processor means for processing said radio signal; and further comprising the step of generating a reset signal having a predetermined pulse width for resetting said processor means when said local oscillation signal is selected between said external clock signal and said internal clock signal, thereby preventing a disturbance in said processing of said radio signal caused by a transition from said external clock signal to said internal clock signal.

* * * * *